US012380230B2

(12) United States Patent
Khan et al.

(10) Patent No.: US 12,380,230 B2
(45) Date of Patent: Aug. 5, 2025

(54) SYSTEM AND METHOD FOR GUIDING PRIVACY-ENHANCING TRANSFORMATIONS

(71) Applicant: TRUATA LIMITED, Dublin (IE)

(72) Inventors: Imran Khan, Dublin (IE); Maurice Coyle, Dublin (IE); Barry Smyth, Dublin (IE); Noel Rogers, Dublin (IE); Michael Fenton, Greystones (IE); Aydin Ulas, Dublin (IE); Dave Fagan, Dublin (IE)

(73) Assignee: TRUATA LIMITED, Dublin (IE)

( * ) Notice: Subject to any disclaimer, the term of this patent is extended or adjusted under 35 U.S.C. 154(b) by 236 days.

(21) Appl. No.: 17/752,158

(22) Filed: May 24, 2022

(65) Prior Publication Data

US 2023/0385429 A1 Nov. 30, 2023

(51) Int. Cl.
*G06F 21/60* (2013.01)

(52) U.S. Cl.
CPC .................................. *G06F 21/604* (2013.01)

(58) Field of Classification Search
CPC .................................................... G06F 21/604
See application file for complete search history.

(56) References Cited

U.S. PATENT DOCUMENTS

2004/0098237 A1* 5/2004 Pendergraft ........... G06Q 10/04 703/7
2007/0143851 A1* 6/2007 Nicodemus ......... H04L 63/1433 726/4
2011/0178933 A1* 7/2011 Bailey, Jr. ............... H04L 63/20 726/1
2018/0004978 A1 1/2018 Hebert et al.
2019/0258824 A1 8/2019 Gkoulalas-Divanis
2021/0279219 A1* 9/2021 Fenton .................. G06F 16/221
2022/0001892 A1* 1/2022 Fairley ................. G06V 20/582

OTHER PUBLICATIONS

Li et al., On the Tradeoff Between Privacy and Utility in Data Publishing, Proceedings of the ACM SIGKDD International Conference on Knowledge Discovery and Data Mining, pp. 517-526 (Jun. 20009).

* cited by examiner

*Primary Examiner* — Vance M Little
(74) *Attorney, Agent, or Firm* — Pillsbury Winthrop Shaw Pittman LLP

(57) ABSTRACT

A system and method for guiding privacy-enhancing transformations are described. The system and method include a recommendation engine configured to identify sets of transformations to mitigate a privacy risk below a user specified threshold specified in-terms of privacy-risk score for a given input dataset while keeping the utility of the dataset above the user-specified utility threshold specified in-terms of utility score. A simulation engine configured to simulate the identified set of transformations from the recommendation engine on the dataset to determine the optimal application of the plurality of transformations for maximizing the utility of the dataset, and output device to provide the optimized dataset with the privacy risk score and utility score.

19 Claims, 5 Drawing Sheets

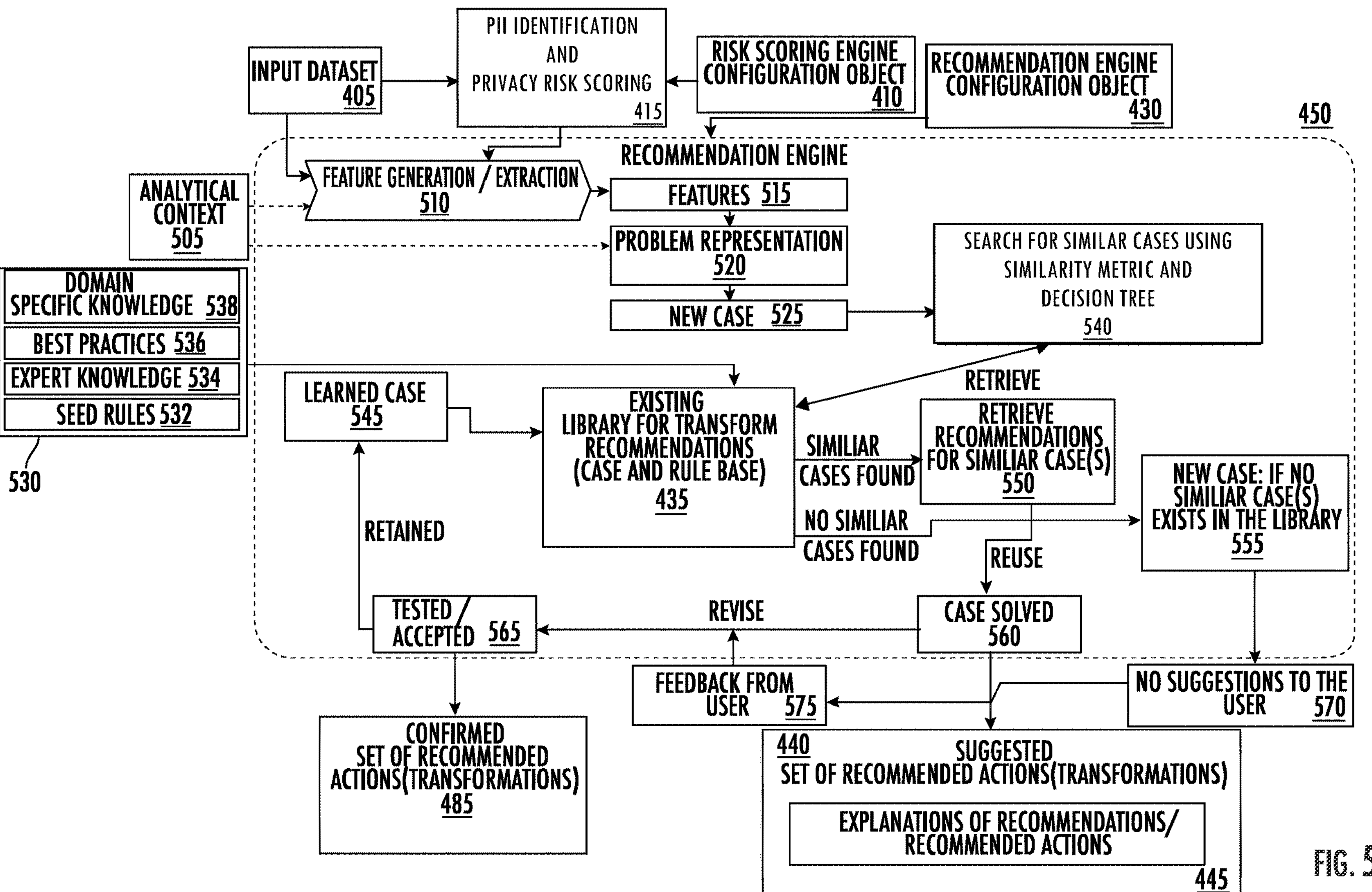
INPUT DATASET 405
PII IDENTIFICATION AND PRIVACY RISK SCORING 415
RISK SCORING ENGINE CONFIGURATION OBJECT 410
RECOMMENDATION ENGINE CONFIGURATION OBJECT 430
450
RECOMMENDATION ENGINE
ANALYTICAL CONTEXT 505
FEATURE GENERATION / EXTRACTION 510
FEATURES 515
PROBLEM REPRESENTATION 520
NEW CASE 525
SEARCH FOR SIMILAR CASES USING SIMILARITY METRIC AND DECISION TREE 540
DOMAIN SPECIFIC KNOWLEDGE 538
BEST PRACTICES 536
EXPERT KNOWLEDGE 534
SEED RULES 532
530
LEARNED CASE 545
EXISTING LIBRARY FOR TRANSFORM RECOMMENDATIONS (CASE AND RULE BASE) 435
RETRIEVE
SIMILIAR CASES FOUND
RETRIEVE RECOMMENDATIONS FOR SIMILIAR CASE(S) 550
NO SIMILIAR CASES FOUND
NEW CASE: IF NO SIMILIAR CASE(S) EXISTS IN THE LIBRARY 555
RETAINED
REUSE
TESTED / ACCEPTED 565
REVISE
CASE SOLVED 560
FEEDBACK FROM USER 575
NO SUGGESTIONS TO THE USER 570
CONFIRMED SET OF RECOMMENDED ACTIONS(TRANSFORMATIONS) 485
440 SUGGESTED SET OF RECOMMENDED ACTIONS(TRANSFORMATIONS)
EXPLANATIONS OF RECOMMENDATIONS/ RECOMMENDED ACTIONS
445
FIG. 5

SYSTEM AND METHOD FOR GUIDING PRIVACY-ENHANCING TRANSFORMATIONS

FIELD OF INVENTION

A system and method for guiding privacy in a data sets is provided. More specifically, a system and method for guiding privacy-enhancing transformations in data sets is provided.

BACKGROUND

In the field of privacy enhancements in data sets, little attention has been paid to generating suitable recommendations of transformations for reducing privacy risk with minimal manual interference. The field of privacy enhancements includes technologies that apply transformations to input datasets. The field of privacy enhancements also includes other technologies that provide transformation techniques and organization-wide privacy policy management and applications. Some technologies in the field of privacy enhancements allow calculation of risk scores for user-provided groups of fields, and provide masking or de-identification capabilities for a dataset.

However, the technologies provided in the field do not provide recommendations to support selection of techniques, do not make automated recommendations to support creation of such policies, and do not support the decisions of the user by suggesting transformations. In other words, the technologies do not provide decision support systems.

SUMMARY

A system and method for guiding privacy-enhancing transformations are described. The system and method include a recommendation engine configured to identify a plurality of transformations to achieve an input level of privacy risk for a dataset identified as a privacy risk score by performing the plurality of transformations on the dataset while maximizing the utility of the dataset identified as a utility score, a simulation engine configured to simulate the identified plurality of transformations from the recommendation engine on the dataset to determine the optimal application of the plurality of transformations, and output device to provide the optimized dataset with the privacy risk and utility. The system and method includes an input dataset. The system and method includes an input configuration object. The recommendation engine further includes a recommendation library including at least one case base, a plurality of seed rules, a plurality of domain specific knowledge, and a plurality of expert knowledge. The recommendation engine further includes a recommendation engine configuration object. The recommendation engine further outputs a plurality of explanations regarding the optimized dataset. The simulation engine applies identified plurality of transformations and measures the attendant privacy risk and utility. The simulation engine checks the thresholds.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 5 illustrates the recommendation engine of FIG. 4 integrated with the simulation engine of FIG. 4 for discovering optimal configurations for transform recommendations.

DETAILED DESCRIPTION

Figure 1:
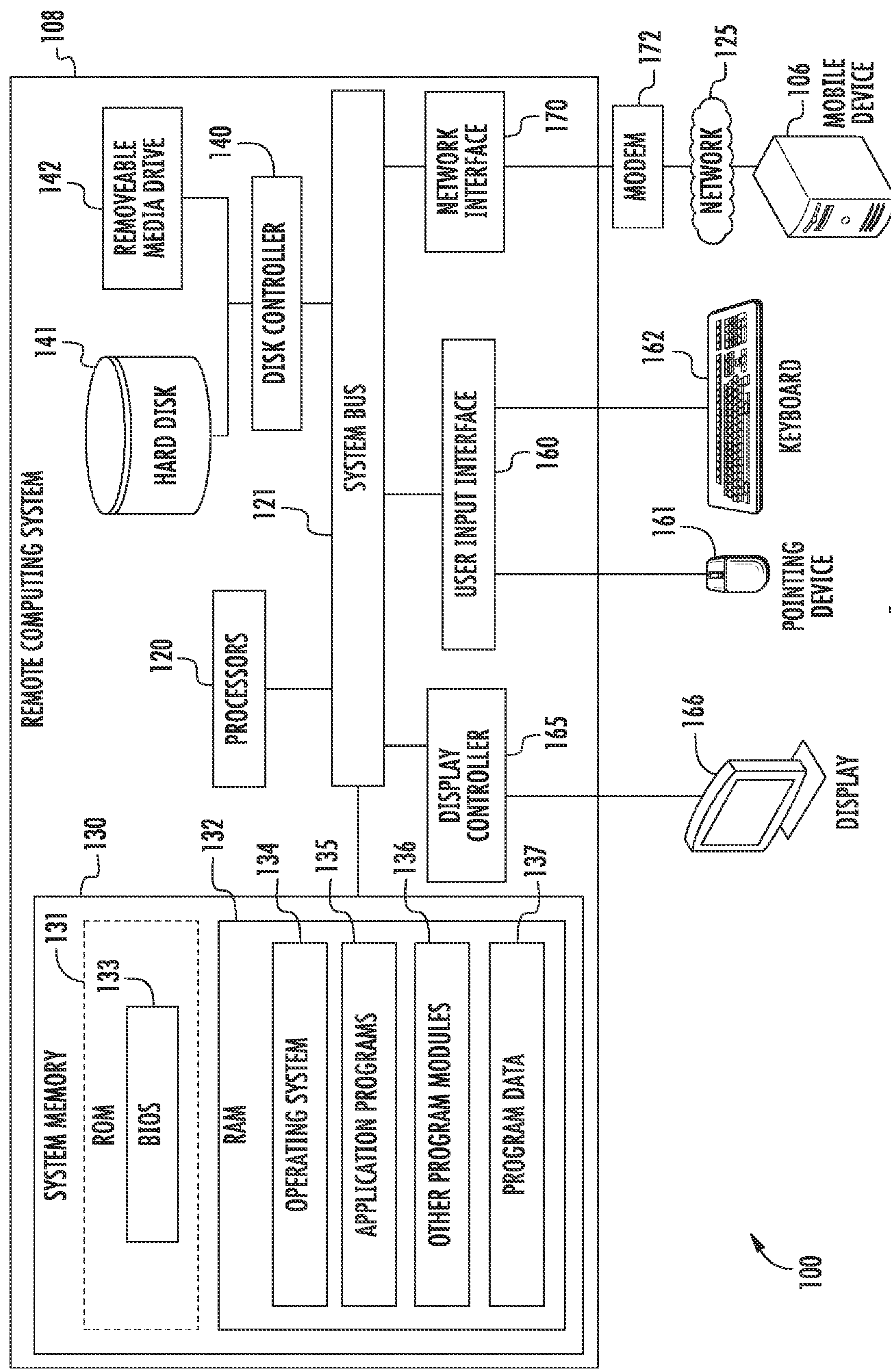
FIG. 1 is a system diagram of an example of a computing environment in communication with a network.

A case-based representation of historical privacy-enhancing transformations incorporating dataset, risk, analytical and context-based signals enabling standardized storage and retrieval of similar cases is provided. A case matching engine that finds suitable or similar cases is described. The case matching engine may operate using the similarity between cases in a library based on a target issue. An automated way of generating recommendations of transformation functions like generalization, masking, tokenization, and the like, for reducing privacy-risk within the datasets that include technique selection and an indication of the level of transformation to be applied are described. Such recommendations of transformation functions reduce cognitive burden and ease information overload from users. Along with helping the user during the transformation process, the recommendations of transformation functions reduce/save users time which ultimately translates into revenue.

A simulation system enables the effect of a given transformation (or a sequence of transformations) to be determined by simulating the application of the given transformation to the target dataset (or a portion of the target dataset) in order to determine the resulting privacy risk and analytical utility. The simulation enables the system (and users) to strike the right balance between data privacy and data utility while reducing the amount of guesswork in selecting a transformation to apply.

The system outputs configurations that provide insight into the expected level of risk reduction and analytical preservation for the data set. The outputs enable the system to maximize the utility of the data while keeping the privacy risk within an acceptable threshold. The system determines the shortest path to the optimal transformation policy. The simulation system may be operated interactively, computer-resource depending, to provide control and visibility into the impact and selection of the optimal transformation policy. The simulation system produces the dataset (or a sample of it) resulting from different transformations allowing an interactive query regarding the data set supporting the anticipated use.

In determining transformations to apply over the fields of a dataset there is often a reliance on the user of the system. There are a wide variety of transformations, many with an arbitrary number of configurations, causing the space of available transformations to be incredibly large. Making optimal selections for transformation of each field in a dataset quickly becomes unfeasible for human users of a transformation system. The present system and method automate the process of determining and applying optimal selections for transformations and generate a suitable recommendation of transformation functions for the risk fields. The simulation system in privacy-preserving analytics minimizes the privacy-risk while maximizing the data utility. Based on simulations, the system and method outputs a set of configurations that maximizes the utility of the datasets while minimizing the privacy-risks in the given datasets.

A system and method for guiding privacy-enhancing transformations are described. The system and method include a recommendation engine configured to identify a plurality of transformations to achieve an input level of privacy risk for a dataset identified as a privacy risk score by performing the plurality of transformations on the dataset while maximizing the utility of the dataset identified as a utility score, a simulation engine configured to simulate the identified plurality of transformations from the recommendation engine on the dataset to determine the optimal application of the plurality of transformations, and output device to provide the optimized dataset with the privacy risk and utility. The system and method includes an input dataset. The system and method includes an input configuration object. The recommendation engine further includes a recommendation library including at least one case base, a plurality of seed rules, a plurality of domain specific knowledge, and a plurality of expert knowledge. The recommendation engine further includes a recommendation engine configuration object. The recommendation engine further outputs a plurality of explanations regarding the optimized dataset. The simulation engine applies identified plurality of transformations and measures the attendant privacy risk and utility. The simulation engine checks the thresholds.

The system and method generates datasets with improved privacy risk and analytical utility, consistently and reliably and more quickly than is possible using manual methods. The system and method provide the ability to generate such datasets without the need for highly trained or experienced data analysts. The system and method support the training of data analysts by using the system in a support mode. The system and method provides recommendations for suitable transformations as described. The user of the system can be data analyst or a data engineer may be shown the recommendations with explanations to aid in helping the user to learn why the transformations are recommended for the given field/column in the dataset. In the event multiple recommendations are provided for one field/column, a ranking may be included with the recommendations. The best-suited recommendation may be identified at the top of the list of recommendations for the given field/column.

FIG. 1 is a system diagram of an example of a computing environment 100 in communication with a network. In some instances, the computing environment 100 is incorporated in a public cloud computing platform (such as Amazon Web Services or Microsoft Azure), a hybrid cloud computing platform (such as HP Enterprise OneSphere) or a private cloud computing platform. As shown in FIG. 1, computing environment 100 includes remote computing system 108 (hereinafter computer system), which is one example of a computing system upon which embodiments described herein may be implemented.

The remote computing system 108 may, via processors 120, which may include one or more processors, perform various functions. The functions may be broadly described as those governed by machine learning techniques. Generally, any problems that can be solved within a computer system. As described in more detail below, the remote computing system 108 may be used to provide (e.g., via display 166) users with a dashboard of information, such that such information may enable users to identify and prioritize models and data as being more critical to the solution than others.

As shown in FIG. 1, the computer system 108 may include a communication mechanism such as a bus 121 or other communication mechanism for communicating information within the computer system 108. The computer system 108 further includes one or more processors 120 coupled with the bus 121 for processing the information. The processors 120 may include one or more CPUs, GPUs, or any other processor known in the art.

The computer system 108 also includes a system memory 130 coupled to the bus 121 for storing information and instructions to be executed by processors 120. The system memory 130 may include computer readable storage media in the form of volatile and/or nonvolatile memory, such as read only system memory (ROM) 131 and/or random-access memory (RAM) 132. System memory 130 may contain and store the knowledge within the system. The system memory RAM 132 may include other dynamic storage device(s) (e.g., dynamic RAM, static RAM, and synchronous DRAM). The system memory ROM 131 may include other static storage device(s) (e.g., programmable ROM, erasable PROM, and electrically erasable PROM). In addition, the system memory 130 may be used for storing temporary variables or other intermediate information during the execution of instructions by the processors 120. A basic input/output system 133 (BIOS) may contain routines to transfer information between elements within computer system 108, such as during start-up, that may be stored in system memory ROM 131. RAM 132 may comprise data and/or program modules that are immediately accessible to and/or presently being operated on by the processors 120. System memory 130 may additionally include, for example, operating system 134, application programs 135, other program modules 136 and program data 137.

The illustrated computer system 108 also includes a disk controller 140 coupled to the bus 121 to control one or more storage devices for storing information and instructions, such as a magnetic hard disk 141 and a removable media drive 142 (e.g., floppy disk drive, compact disc drive, tape drive, and/or solid-state drive). The storage devices may be added to the computer system 108 using an appropriate device interface (e.g., a small computer system interface (SCSI), integrated device electronics (IDE), Universal Serial Bus (USB), or FireWire).

The computer system 108 may also include a display controller 165 coupled to the bus 121 to control a monitor or display 166, such as a cathode ray tube (CRT) or liquid crystal display (LCD), for displaying information to a computer user. The illustrated computer system 108 includes a user input interface 160 and one or more input devices, such as a keyboard 162 and a pointing device 161, for interacting with a computer user and providing information to the processor 120. The pointing device 161, for example, may be a mouse, a trackball, or a pointing stick for communicating direction information and command selections to the processor 120 and for controlling cursor movement on the display 166. The display 166 may provide a touch screen interface that may allow inputs to supplement or replace the communication of direction information and command selections by the pointing device 161 and/or keyboard 162.

The computer system 108 may perform a portion or each of the functions and methods described herein in response to the processors 120 executing one or more sequences of one or more instructions contained in a memory, such as the system memory 130. These instructions may include the flows of the machine learning process(es) as will be described in more detail below. Such instructions may be read into the system memory 130 from another computer readable medium, such as a hard disk 141 or a removable media drive 142. The hard disk 141 may contain one or more data stores and data files used by embodiments described herein. Data store contents and data files may be encrypted to improve security. The processors 120 may also be employed in a multi-processing arrangement to execute the one or more sequences of instructions contained in system memory 130. In alternative embodiments, hard-wired circuitry may be used in place of or in combination with software instructions. Thus, embodiments are not limited to any specific combination of hardware circuitry and software.

As stated above, the computer system 108 may include at least one computer readable medium or memory for holding instructions programmed according to embodiments described herein and for containing data structures, tables, records, or other data described herein. The term computer readable medium as used herein refers to any non-transitory, tangible medium that participates in providing instructions to the processor 120 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 141 or removable media drive 142. Non-limiting examples of volatile media include dynamic memory, such as system memory 130. Non-limiting examples of transmission media include coaxial cables, copper wire, and fiber optics, including the wires that make up the bus 121. Transmission media may also take the form of acoustic or light waves, such as those generated during radio wave and infrared data communications.

The computing environment 100 may further include the computer system 108 operating in a networked environment using logical connections to local computing device 106 and one or more other devices, such as a personal computer (laptop or desktop), mobile devices (e.g., patient mobile devices), a server, a router, a network PC, a peer device or other common network node, and typically includes many or all of the elements described above relative to computer system 108. When used in a networking environment, computer system 108 may include modem 172 for establishing communications over a network, such as the Internet. Modem 172 may be connected to system bus 121 via network interface 170, or via another appropriate mechanism.

Network 125, as shown in FIG. 1, may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 108 and other computers (e.g., local computing device 106).

Figure 2:
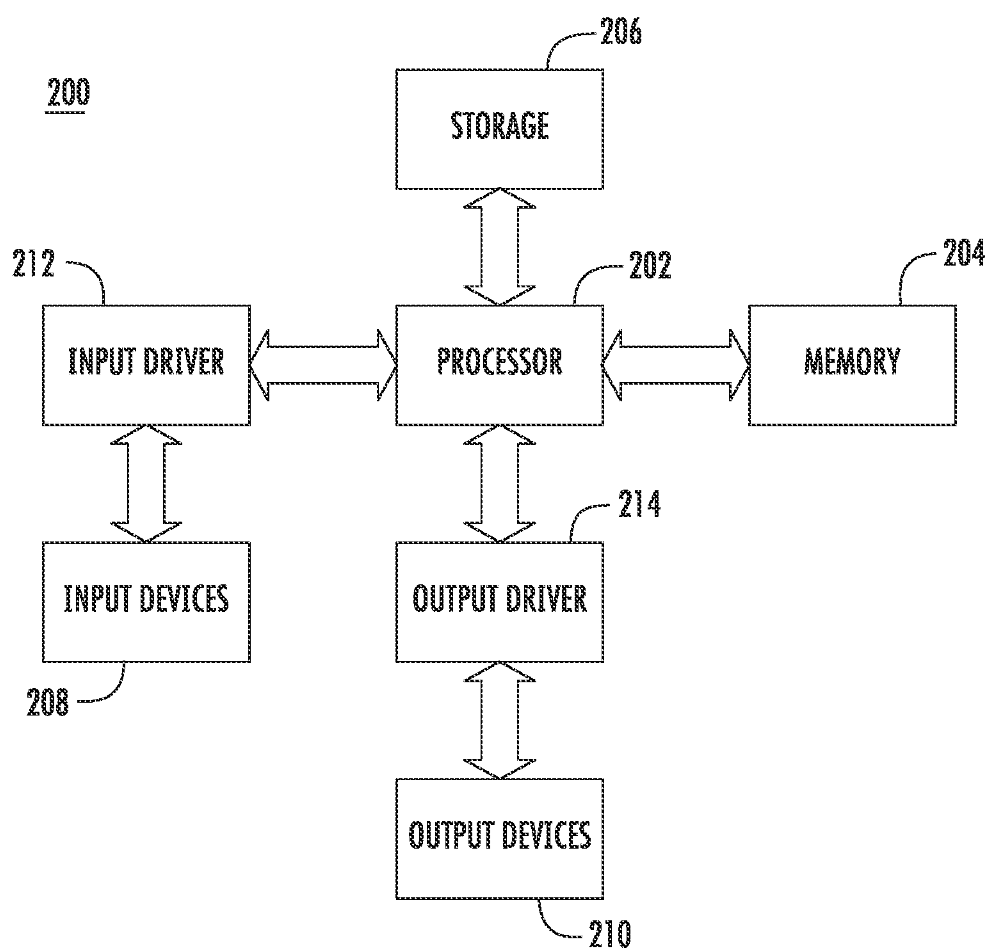
FIG. 2 is a block diagram of an example device in which one or more features of the disclosure can be implemented.

FIG. 2 is a block diagram of an example device 200 in which one or more features of the disclosure can be implemented. The device 200 may be local computing device 106, for example. The device 200 can include, for example, a computer, a gaming device, a handheld device, a set-top box, a television, a mobile phone, or a tablet computer. The device 200 includes a processor 202, a memory 204, a storage device 206, one or more input devices 208, and one or more output devices 210. The device 200 can also optionally include an input driver 212 and an output driver 214. It is understood that the device 200 can include additional components not shown in FIG. 2 including an artificial intelligence accelerator.

In various alternatives, the processor 202 includes a central processing unit (CPU), a graphics processing unit (GPU), a CPU and GPU located on the same die, or one or more processor cores, wherein each processor core can be a CPU or a GPU. In various alternatives, the memory 204 is located on the same die as the processor 202, or is located separately from the processor 202. The memory 204 includes a volatile or non-volatile memory, for example, random access memory (RAM), dynamic RAM, or a cache.

The storage device 206 includes a fixed or removable storage means, for example, a hard disk drive, a solid-state drive, an optical disk, or a flash drive. The input devices 208 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 210 include, without limitation, a display, a speaker, a printer, a haptic feedback device, one or more lights, an antenna, or a network connection (e.g., a wireless local area network card for transmission and/or reception of wireless IEEE 802 signals).

The input driver 212 communicates with the processor 202 and the input devices 208, and permits the processor 202 to receive input from the input devices 208. The output driver 214 communicates with the processor 202 and the output devices 210, and permits the processor 202 to send output to the output devices 210. It is noted that the input driver 212 and the output driver 214 are optional components, and that the device 200 will operate in the same manner if the input driver 212 and the output driver 214 are not present.

Figure 3:
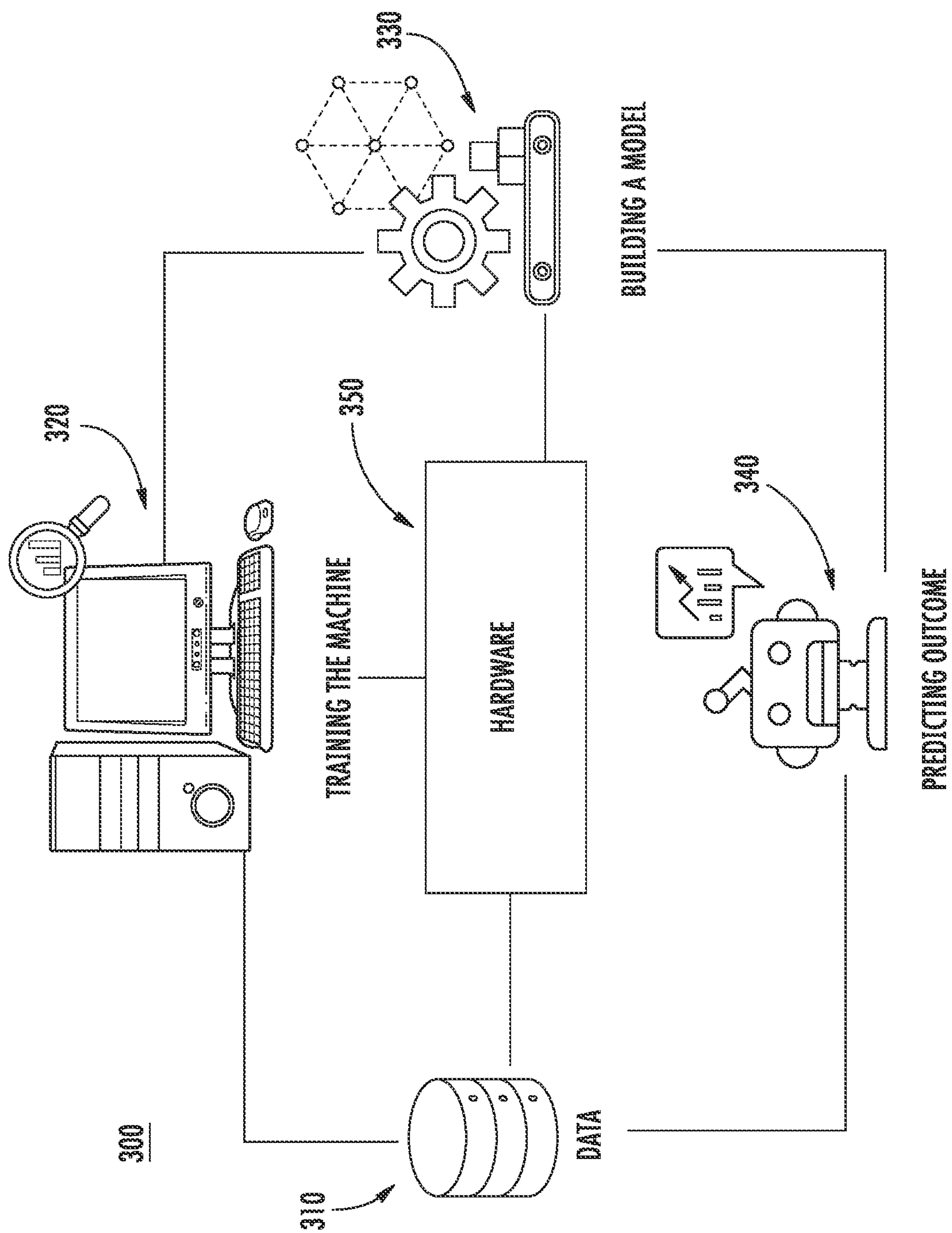
FIG. 3 illustrates a graphical depiction of an artificial intelligence—machine learning system incorporating the example device of FIG. 2.

FIG. 3 illustrates a graphical depiction of an artificial intelligence system 300 incorporating the example device of FIG. 2. System 300 includes data 310, a machine 320, a model 330, a plurality of outcomes 340 and underlying hardware 350. System 300 operates by using the data 310 to train the machine 320 while building a model 330 to enable a plurality of outcomes 340 to be predicted. The system 300 may operate with respect to hardware 350. In such a configuration, the data 310 may be related to hardware 350, for example. For example, the data 310 may be on-going data, or output data associated with hardware 350. The machine 320 may operate as the controller or data collection associated with the hardware 350, or be associated therewith. The model 330 may be configured to model the operation of hardware 350 and model the data 310 collected from hardware 350 in order to predict the outcome achieved by hardware 350. Using the outcome 340 that is predicted, hardware 350 may be configured to provide a certain desired outcome 340 from hardware 350.

In anonymization systems, the selection, sequencing and application of appropriate anonymization functions (also referred to as transformations), such as tokenization, generalization, and the like, to the data fields of sensitive personal datasets in order to produce an anonymized version of the original dataset that retains many of the analytical properties of the original is both complicated and important. For example, given a unique identifier field, the user/data analyst must determine which transformations to apply in order to anonymize that field. Once a transformation is selected, the level of transformation may also need to be determined (e.g., the amount to perturb a value) because different types of transformations need to be parameterized and configured.

The ultimate objective, in selecting and configuring the transformation, is to achieve the dual, and often conflicting, goals of preserving analytical utility while decreasing re-identification risk.

There are field types and transformations that may be used in protecting the privacy of data. One example, is a "direct identifier" field in the dataset, such as a telephone number. The direct identifier may be transformed using a hash-based tokenization function. Such a transformation transforms a telephone number into a hash-code that may be a suitable approach to enable longitudinal analysis by using the field as a key while irreversibly obfuscating its original value. If a portion of the telephone number is analytically useful (e.g., the area code), then a format-preserving encryption (FPE) may be used to preserve the desired portion while obfuscating the remainder of the field. As described, these techniques preserve a level of analytical utility and FPE preserves the level of analytical utility even to a higher degree.

In a second example, the DateTime field with a high granularity, such as to the level of milliseconds, nanoseconds or just seconds, for example, may serve as a unique fingerprint or "quasi-identifier." The DateTime field may be transformed by generalizing the field by reducing granularity. This generalizing may be achieved, for example, by applying masking, removing seconds, or minutes, for example. By generalizing certain values, the values become indistinguishable from each other.

A combination of fields such as Zip code, Date of Birth and Gender may cause a high privacy-risk score as these fields can be collectively used to uniquely identify specific individuals. Thus, even though no single field can be used to identify an individual, when taken as group there can be a significant privacy risk. In this type of situation, a portion of the Zip code may be masked and the Date of Birth fields may be generalized to reduce this risk. By considering a group of fields together enables transformations to be applied and adjusted on a field-by-field basis to balance the degree of anonymization more effectively while maximizing the preserved analytical utility.

For an amount field in the dataset, a number of transformations may be applicable, including rounding, masking, perturbation, binning, etc. The particular transformation or transformations applied may depend on context. For example, for aggregated reporting, binning may be appropriate, while for field-level statistics, balanced perturbation may be better. Generally, each transformation preserves analytical utility for certain calculations, which creates the situation where there is no single optimal transformation for an amount field in the dataset, instead there may be one or more optimal transformations for the amount field for each specific context of the dataset.

In a similar way, location (latitude-longitude) values can be generalized to reduce privacy risk by removing the least significant digits. The extent to which the least significant digits are removed reduces both privacy risk by covering a larger area and analytical utility because pinpoint accuracy is sacrificed. As would be understood, based on the application for the dataset, more removal is optimal when the pinpoint accuracy is not needed and less removal is optimal when more location accuracy is needed.

Other transformations include recommending actions that turn the dataset into a k-anonymous version of the dataset. As would be understood, k-anonymity is one of the formal privacy models and can be considered as a characteristic of data, which is measured as part of privacy-risk scoring. An example of these actions includes the redaction of non-k-anonymous rows. Removal of the rows removes any privacy concerns with the rows while also removing the utility associated with the data in those rows.

Traditionally, the task of selecting, configuring, and applying an appropriate set of transformations requires an experienced data analyst with the ability to determine the optimal set of transformations to balance or optimize privacy risk and analytical utility. As would be understood, such an experienced data analyst requires a high level of knowledge, expertise, and experience.

Performing suboptimal transformations may aid in reducing the privacy risk, but because it is suboptimal the reduction in privacy risk is at the unnecessary expense of analytical utility. These suboptimal transformations result in a transformed dataset with a low privacy risk but that is not optimal from an analysis perspective. A similar privacy benefit might be achievable with a greater degree of analytical utility, if a different set of transformations had been chosen.

The present system and method are configured to achieve the maximum utility for a given privacy threshold for structured data by balancing the privacy-utility trade-off. The aim of Privacy-Enhancing Technologies (PETs) in context of structured data is to enable analysts to extract meaningful insights from datasets while preserving the privacy of the individuals therein. This is traditionally achieved using perturbation mechanisms (transformations) that transform the data in such that way that the privacy-risk is reduced. While the transformed dataset lowers the inherited privacy-risks in the given dataset, the question that arises is whether that transformed dataset exhibits the maximum possible utility. The present system and method provide a way to objectively quantify the privacy-risks as well as to objectively quantify the analytical utility of the dataset. With these quantified metrics, an exploration of the possible transformations to optimize each metric becomes possible.

The described system and method provide a system and method that determine a set of suitable transformation function recommendations for the various personal sensitive data fields in the dataset. These transformation function recommendations are generated by a recommendation engine while considering factors like the personal data type (e-mail, age, phone number, name, ID etc.), the statistical data types (numerical, categorical), data type (representation while programming for implementation i.e., Int, String, Boolean etc.), and most significant factors of the privacy-risk score associated with the dataset, as described above.

Figure 4:
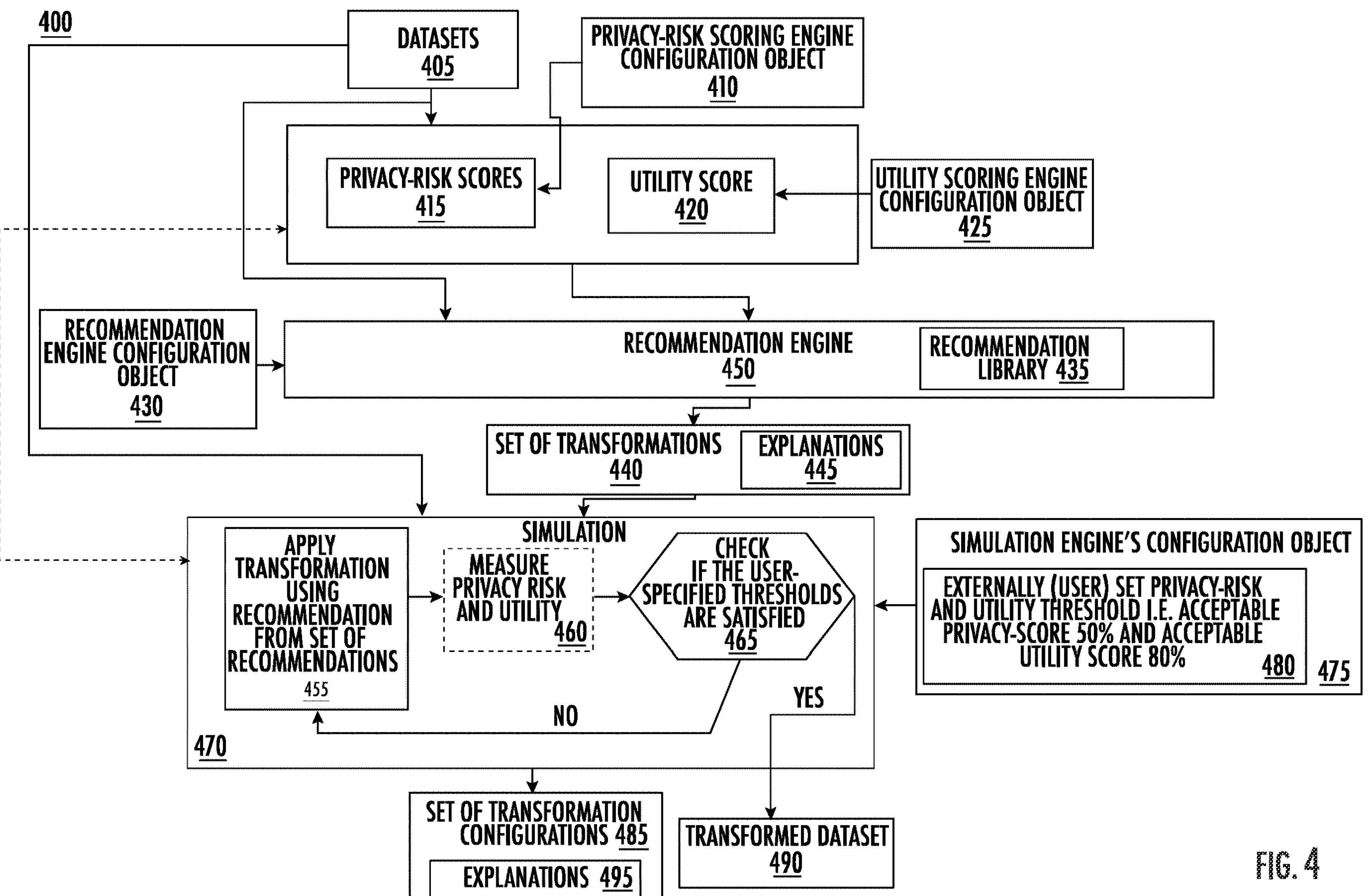
FIG. 4 illustrates a flow in a system of an exemplary case-based transform recommendation engine configured to discover an optimal configuration of transformation designed to provide optimal privacy protection and maintaining utility of a dataset.

FIG. 4 illustrates a flow in a system 400 of an exemplary case-based transform recommendation engine configured to discover an optimal configuration of transformation designed to provide optimal privacy protection and maintaining utility of a dataset 405. System 400 operates to examine the privacy-risk and utility scores in order to compute an optimal configuration for a system that provides privacy-enhancing transformations. The described system and method optimize the utility of a dataset while considering the objectively quantified privacy-risk scores and general utility scores. The system 400 enables organizations to maximize the derivation of meaningful insights while remaining within an acceptable privacy-risk threshold defined by the organization or regulators.

The system 400 receives an input dataset 405. This input dataset 405 may contain privacy-risks and the aim of the recommendation engine 450 is to minimize or mitigate the privacy-risks inherent in this dataset. System 400 also receives an input configuration objects/files 410 including privacy-risk scoring engine configuration object and utility scoring engine configuration object 425. The privacy-risk scores 415 and the utility score 420 for the input datasets 405 are calculated.

The privacy-risk scores 415 and utility score 420 along with the dataset 405 are input to the recommendation engine 450. The recommendation engine 450 may include a recommendations library 435. The recommendation library includes a case base, seed rules, domain specific and expert knowledge. The recommendation engine 450 may include a recommendation engine configuration object 430 as input. The recommendation engine configuration object may include parameter values to initiate the recommendation engine. Based on the recommendation engine configuration object 430 and the library 435, the recommendation engine 450 analyzes the input dataset 405 and privacy-risk scores 415 and utility score 420 associated with dataset 405 to produce a series of transformations 440 along with explanations 445 associated with the transformations 440.

The system 400 provides as output from the recommendation engine 450 a set of suitable actions/transformations 440 for each identified risk (from the privacy point of view) field within the dataset with each transformation in the set of transformations with its determined (recommended) configuration i.e., t1 (f1, c1), t2 (f2, c2) so on and so forth, that results in maximum utility for the given privacy-risk threshold. A transformation function is designed to be applied to field fi using configuration ci. The order of recommended transformations defines the application order. The system 400 determines the shortest path to the optimal transformation policy. A corresponding explanation 445 to justify the selection of a given transformation for a given field type is provided.

Transformations can be performed at column, row, or cell level, to provide increasing levels of control over the privacy risk and analytical utility of the resulting outputs. System 400 account for the different levels of applied transformations across column, row, and cell, for example. Inputs such as measurement of which rows or values could be altered or removed to achieve different levels of k-anonymity may be included. In one embodiment, the simulation engine 470 allows for review and amendment of the specific rows and values involved in order to make a more effective selection.

The set of transformations 440 and explanations 445 with the dataset 405 is input into a simulation engine 470. The simulation engine 470 further aids the system 400 by showing the impact of the transformation policy including transformations 440 and explanations 445. The simulation engine 470 may be input a simulation engine configuration object 475. The simulation engine configuration object 470 may include therein an externally set privacy-risk and utility threshold 480. The thresholds 480 may be user specified. The recommendation system during the simulation process generates several sets of recommendations (transformations) for mitigating privacy-risks. Some of these sets of recommendations (transformations) when are applied to the dataset reduce the privacy-risks and impacts the utility of the datasets. Therefore, the user specified privacy-risk threshold and utility threshold ensures that the final outputs are within the user's privacy-risk while having utility that is desired by the user. For instance, a user may specify a thresholds 480 as the acceptable privacy-score of 50% and acceptable utility score of 80% which means that only those sets of recommended transformations when applied to the dataset having privacy-risk scores below 50% and utility scores higher than 80% are considered during the simulation process.

Simulation engine 470 may apply the recommendation engine 450 transformations at step 455. After application of the recommended transformations the simulation engine 470 measures the privacy risk and utility 460. The simulation engine 470 checks that the thresholds 480 are satisfied at step 465. If not, the simulation engine may revert to step 455 or revert back to the inputs of the recommendation engine 450.

Once the simulation engine 470 meets the checks at step 465, the transformed dataset 490 is output with a set of transformation configurations 485 and explanations of the transformations 495.

Recommendation engine 450 enables system 400 to achieve the maximum utility for a given privacy threshold for structured data by balancing the privacy-utility trade-off. Module 415 objectively quantifies the privacy-risks while module 420 objectively quantifies the analytical utility of the dataset. These metrics are passed in to the recommendation engine 450, the possible transformations in order to optimize each metric are explored. The recommendation engine 450 outputs a transformation configuration 440 that is used in the simulation engine 470 to identify configurations that result in maximum utility.

FIG. 5 illustrates the recommendation engine 450 integrated with the simulation engine 470 for discovering optimal configurations for transformation recommendations. FIG. 5 provides additional details not shown in the system 400 of FIG. 4. As described above with respect to FIG. 4, system 400 operates to examine the privacy-risk and utility scores in order to compute an optimal configuration for a system that provides privacy-enhancing transformations that optimize the utility of a dataset while considering the objectively quantified privacy-risk scores and general utility scores. The system 400 includes as input an input dataset 405. This input dataset 405 may include privacy-risk and the aim of the recommendation engine 450 is to minimize the privacy risk inherent in this dataset. System 400 also inputs input configuration objects/files 410 including privacy-risk scoring engine configuration object and utility scoring engine configuration object 425. The privacy-risk scores 415 and the utility score 420 for the input datasets 405 are calculated.

The privacy-risk scores 415 and utility score 420 along with the dataset 405 are input to the recommendation engine 450. The recommendation engine 450 may include a recommendations library 435. The recommendation library includes a case base, seed rules, domain specific and expert knowledge. Based on the recommendation engine configuration object 430 and the library 435, the recommendation engine 450 analyzes the input dataset 405 and privacy-risk scores 415 and utility score 420 associated with dataset 405 to produce a series of transformations 440 along with explanations 445 associated with the transformations 440.

The system 400 as output from the recommendation engine 450 provides a set of suitable actions/transformations 440 for each identified risk (from the privacy point of view) field within the dataset with each transformation in the set of transformations with its determined (recommended) configuration i.e., t1 (f1, c1), t2 (f2, c2) so on and so forth, that results in maximum utility for the given privacy-risk threshold. A transformation function is designated to be applied to field fi using configuration ci. The order of recommended transformations defines the application order. The system 400 determines the shortest path to the optimal transformation policy. A corresponding explanation 445 to justify the selection of a given transformation for a given field type is provided.

Recommendation engine 450 enables system 400 to achieve the maximum utility for a given privacy threshold for structured data by balancing the privacy-utility trade-off. Module 415 objectively quantifies the privacy-risks while module 420 objectively quantifies the analytical utility of the dataset. These metrics are passed in to the recommendation engine 450, the possible transformations are explored in order to optimize each metric are explored. The recommendation engine 450 outputs a transformation configuration 440 that is used in the simulation engine 470 to identify configurations that result in maximum utility.

FIG. 5 further illustrates recommendation engine 450. The recommendation engine 450 includes a feature generator/extractor 510. Feature generator/extractor 510 receives the input dataset 405 and the privacy risk scores 415 as input and further generates a feature vector for each column in the dataset that is used by the recommendation engine 450 to find suitable transformations. Additionally, the analytical context 505, that is, context about the analytical use case for the dataset, is provided that augments the feature generation process. Feature generator/extractor 510 outputs features vector 515 for each column. The features vector 515 may include the features associated with each column/field in the dataset. Features vector 515 are provided along with the analytical context 505 that enables to creation of a problem representation 520. The extracted features are represented in a structured form from a semi structured or unstructured form. From the problem representation 520 new case 525 is identified. The identified features 515 and analytical context 505 enable the case to be represented as a mathematical set. A search for similar cases 540 may be performed. The identified features 515 may be used to compare with cases in the library 435. This comparison may be performed using a similarity metric and decision tree based on the new case 540 represented as a mathematical set and compared to the cases in the library similarly represented as a mathematical set. The search for similar cases may be performed in communication with the library 435. New case 540 is then matched with the ones in the library 435 to find the closest match as described. The recommendation system may provide the closest match of cases in the library 435 for the new case 540 and can further be configured to find and provide the top X (e.g., top 5 or top 10) similar cases from the library 435. Once identified, the matched cases may be retrieved.

Recommendation library 435 may include cases. A number of initial cases are pre-defined for the cold start scenario, for example. The cold start scenario is when the recommendation system is used for the first time. In order to solve the challenge of cold start, a number of cases in the recommendation library are pre-defined. The pre-defined cases are based on an external set of inputs 530. These external set of inputs 530 may include domain specific knowledge 538, best practices 536, expert knowledge 534, and seed rules 532. The domain specific knowledge 538 in this instance refers to the domain of data anonymization and privacy enhancing technologies. Expert knowledge 534 refers to expertise with anonymization, privacy-risk assessment, and privacy-risk mitigation processes. Best practices 536 refers to the accepted procedures and process in the domain of anonymization. Seed rules 532 refers to initial rules for transformations for an accepted rule is if there is an identifier in the dataset then it is recommended to tokenize the identifier. These external set of inputs 530 may contribute to generating cases for cold start scenario.

Another input to the recommendation library 435 is the learned cases 545 during the execution of the recommendation system. The recommendation system learns new cases during the execution as well as refine the existing cases in the recommendation library and then these new and revise cases are feed into the recommendation library 435. The recommendation library 435 in communication with the query for searching for similar cases 540, in instances where similar cases are found retrieves the recommendations for the similar cases at step 550. The recommendations from the similar cases may be reused and the case may be solved with the recommendations at step 560. These recommendations may be output as suggested recommendations at 440. Further, the case may be added back into the library 435 as a new case with associated recommendations based on the testing and acceptance 565 and learned case 545 feedback.

In the instance where a similar case is not found in the library 435, a new case may be created at step 555 and no suggestions provided at step 570. Feedback from the user at step 575 may be received. The user feedback 575 is part of the learning process and supports the revision of the cases, for example, when the recommendation system encounters a new personal data type for which there is no existing transformations in the recommendation library. In this case the user, via a feedback loop, specifies a transformation for that new personal data type which is then stored as part of a case into recommendation library. This feedback may be entered into the feedback loop with the library 435. The case may be added back into the library 435 as a new case with the recommendations based on the testing and acceptance 565 and learned case 545 feedback.

For both instances of the library 435 check, ones with similar cases and ones that are new, once the testing and acceptance 565 is performed, and the set of recommended action and transformations is output at step 485.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A system for guiding privacy-enhancing transformations to manage privacy risk and analytical utility, wherein privacy risk is the risk that an individual or entity is capable of being identified or an attribute is capable of being inferred about the individual or entity and analytical utility defines analytical usefulness of transformed data in terms of the use cases it can support and/or similarity of outputs produced relative to the original data, the system comprising:

a recommendation engine executed by a processor coupled to a memory, the recommendation engine configured to identify a plurality of transformations to achieve an input level of privacy risk for a dataset identified as a privacy risk score by performing the plurality of transformations on the dataset while maximizing the analytical utility of the dataset identified as an analytical utility score;

a simulation engine executed by the processor coupled to the memory, the simulation engine configured to process the identified plurality of transformations from the recommendation engine on the dataset to determine the optimal application of the plurality of transformations; and an output device to provide the optimized dataset with the privacy risk and analytical utility.

2. The system of claim 1, further comprising an input dataset.

3. The system of claim 1, further comprising an input configuration object.

4. The system of claim 3 wherein the input configuration object includes at least one of a privacy risk scores and analytical utility scores.

5. The system of claim 1, wherein the recommendation engine further comprises a recommendation library including at least one case base, a plurality of seed rules, a plurality of domain specific knowledge, and a plurality of expert knowledge.

6. The system of claim 1 wherein the recommendation engine further includes a recommendation engine configuration object.

7. The system of claim 6 wherein the recommendation engine configuration object include parameter values.

8. The system of claim 1 wherein the recommendation engine further outputs a plurality of explanations regarding the optimized dataset.

9. The system of claim 1 wherein the simulation engine applies identified plurality of transformations and measures the attendant privacy risk and analytical utility.

10. The system of claim 1 wherein the simulation engine checks the thresholds.

11. The system of claim 10 wherein checking the thresholds includes ensuring that the outputs are within the input privacy risk and analytical utility requirements.

12. A method for guiding privacy-enhancing transformations to manage privacy risk and analytical utility, wherein privacy risk is the risk that an individual or entity is capable of being identified or an attribute is capable of being inferred about the individual or entity and analytical utility defines analytical usefulness of transformed data in terms of the use cases it can support and/or similarity of outputs produced relative to the original data, the method comprising:

identifying a plurality of transformations to achieve an input level of privacy risk for a dataset identified as a privacy risk score by performing the plurality of transformations on the dataset while maximizing the utility of the dataset identified as an analytical utility score;

simulating the identified plurality of transformations from the recommendation engine on the dataset to determine the optimal application of the plurality of transformations; and outputting the optimized dataset with the privacy risk and analytical utility.

13. The method of claim 12, further comprising inputting an input dataset.

14. The method of claim 12, further comprising inputting an input configuration object.

15. The method of claim 14 wherein the input configuration object includes at least one of a privacy risk scores and analytical utility scores.

16. The method of claim 12 further comprising outputting a plurality of explanations regarding the optimized dataset.

17. The method of claim 12 further comprising applying identified plurality of transformations and measuring the attendant privacy risk and analytical utility.

18. The method of claim 12 further comprising checking the thresholds.

19. The method of claim 18 wherein checking the thresholds includes ensuring that the outputs are within the input privacy risk and analytical utility requirements.

* * * * *